United States Patent
Agnihotri

(10) Patent No.: US 6,998,527 B2
(45) Date of Patent: Feb. 14, 2006

(54) SYSTEM AND METHOD FOR INDEXING AND SUMMARIZING MUSIC VIDEOS

(75) Inventor: Lalitha Agnihotri, Fishkill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/176,239

(22) Filed: Jun. 20, 2002

(65) Prior Publication Data
US 2003/0233929 A1    Dec. 25, 2003

(51) Int. Cl.
A63H 5/00      (2006.01)
G04B 13/00   (2006.01)
G10H 7/00     (2006.01)

(52) U.S. Cl. .................. 84/609; 84/649; 84/477 R
(58) Field of Classification Search .......... 84/600–602, 84/609–613, 615, 634, 649–653, 666
See application file for complete search history.

(56) References Cited

U.S. PATENT DOCUMENTS

| | | | |
|---|---|---|---|
| 5,107,343 A | 4/1992 | Kawai | 358/341 |
| 5,614,940 A | 3/1997 | Cobbley | 348/7 |
| 6,496,802 B1 * | 12/2002 | van Zoest et al. | 705/14 |
| 6,608,930 B1 | 8/2003 | Agnihotri et al. | 382/176 |
| 6,618,551 B1 * | 9/2003 | Tanaka et al. | 386/96 |
| 2004/0078188 A1 * | 4/2004 | Gibbon et al. | 704/1 |
| 2004/0170392 A1 * | 9/2004 | Lu et al. | 386/96 |

FOREIGN PATENT DOCUMENTS

| | | |
|---|---|---|
| EP | 0903676 A2 | 3/1999 |
| GB | 2264385 A | 8/1993 |
| WO | 9941684 A1 | 8/1999 |

OTHER PUBLICATIONS

Yahoo's Music Videos—"Launch.com" website, pp. 1-15 (numbered at bottom).*

"Classification of General Audio Data for Content-Based Retrieval", by Dongge Li et al., Pattern Recognition Letters vol. 22, pp. 533-544 (2001).

* cited by examiner

Primary Examiner—Marlon T. Fletcher
(74) Attorney, Agent, or Firm—Steven R. Petersen

(57) ABSTRACT

A system and method is disclosed for indexing and summarizing music videos. A music video summary controller in a video playback device receives a multimedia data stream that contains a plurality of music videos. The music video summary controller (1) segments and identifies the music videos, and (2) creates a music video summary file for each music video. The music video summary file contains information such as title of the song and the name of the artist. The music video summary file also contains an identifying audio segment and video segment of the song. A user can access a list of the music video summary files and select which music video to play on the video playback device by selecting its corresponding music video summary file.

8 Claims, 8 Drawing Sheets

SYSTEM AND METHOD FOR INDEXING AND SUMMARIZING MUSIC VIDEOS

TECHNICAL FIELD OF THE INVENTION

The present invention is directed in general to communication systems, and more particularly, to a system and method in a video display system for indexing and summarizing music videos.

BACKGROUND OF THE INVENTION

A wide variety of video playback devices are available in the marketplace. Most people own, or are familiar with, a video cassette recorder (VCR). A video tape recorder (VTR) is another type of video playback device. More recently, video recorders that use computer magnetic hard disks rather than magnetic cassette tapes to store video programs have appeared in the market. For example, the ReplayTVJ recorder and the TiVOJ recorder digitally record television programs on hard disk drives using, for example, MPEG-2 compression. Additionally, some video playback devices may record on a readable/writable digital versatile disk (DVD) rather than a magnetic disk.

Many people record music videos on a video playback device. It is possible to record several hours of video programming from a television channel that shows music videos. A well known example of such a television channel is MTV. Some music video channels, however, spend a great deal of time advertising and talking about various unrelated topics. This reduces the amount of time that is devoted to playing music videos.

If a viewer records an entire program, the recording will include all the non-music video portions such as advertising and talking. To view the music videos it is necessary for the viewer to fast forward the recording past the non-music video portions, stop the recording, play the music video, then fast forward the recording again to the next music video, play the next music video, and so on. This task is laborious and time consuming. In addition, a large amount of recording capacity of the video playback device is spent recording unwanted material such as advertising and talking.

There is therefore a need in the art for a system and method that is capable of indexing and summarizing music videos. There is also a need in the art for a system and method that identifies music videos in a multimedia data stream and prepares a summary of each music video that includes relevant music video information.

SUMMARY OF THE INVENTION

To address the above-discussed deficiencies of the prior art, it is a primary object of the present invention to provide, for use in a video playback device, a system and method for indexing and summarizing music videos.

The present invention comprises a music video summary controller and music video summary computer software in a video playback device. The music video summary controller receives a multimedia data stream that contains a plurality of music videos. The music video summary controller (1) segments and identifies the music videos, and (2) creates a music video summary file for each music video. The music video summary file contains information such as title of the song and the name of the artist. The music video summary file also contains an identifying audio segment and video segment of the song. The music video summary controller compiles and displays a list of music video summary files.

A music video summary file is created for each music video that is detected in the multimedia data stream. A user can access the list of the music video summary files and select which music video to play on the video playback device by selecting its corresponding music video summary file.

According to an advantageous embodiment of the invention, the music video summary controller segments and identifies each music video of a plurality of music videos.

According to another advantageous embodiment of the present invention, the music video summary controller creates a music video summary block for each music video. A music video summary block contains information such as a title of a song, a name of an album that contains the song, a name of an artist or group who recorded the song, the recording studio, and the date of release of the song.

According to an advantageous embodiment of the present invention, the music video summary controller creates a music video summary file for each music video. A music video summary file contains the information stored in a music video summary block, an audio segment of the song, and a video segment of the music video.

According to an advantageous embodiment of the present invention, the music video summary controller is capable of identifying a music video by locating video text blocks at the beginning and end of a music video.

According to another advantageous embodiment of the present invention, the music video summary controller is capable of identifying a music video by creating a search string that comprises one or more words in the lyrics of a song to be searched for and by matching the search string with a transcript of song lyrics.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a television receiver. However, this embodiment is by way of example only and should not be construed to limit the scope of the present invention to television receivers. In fact, those skilled in the art will recognize that the exemplary embodiment of the present invention may easily be modified for use in any type of video display system.

Figure 1:
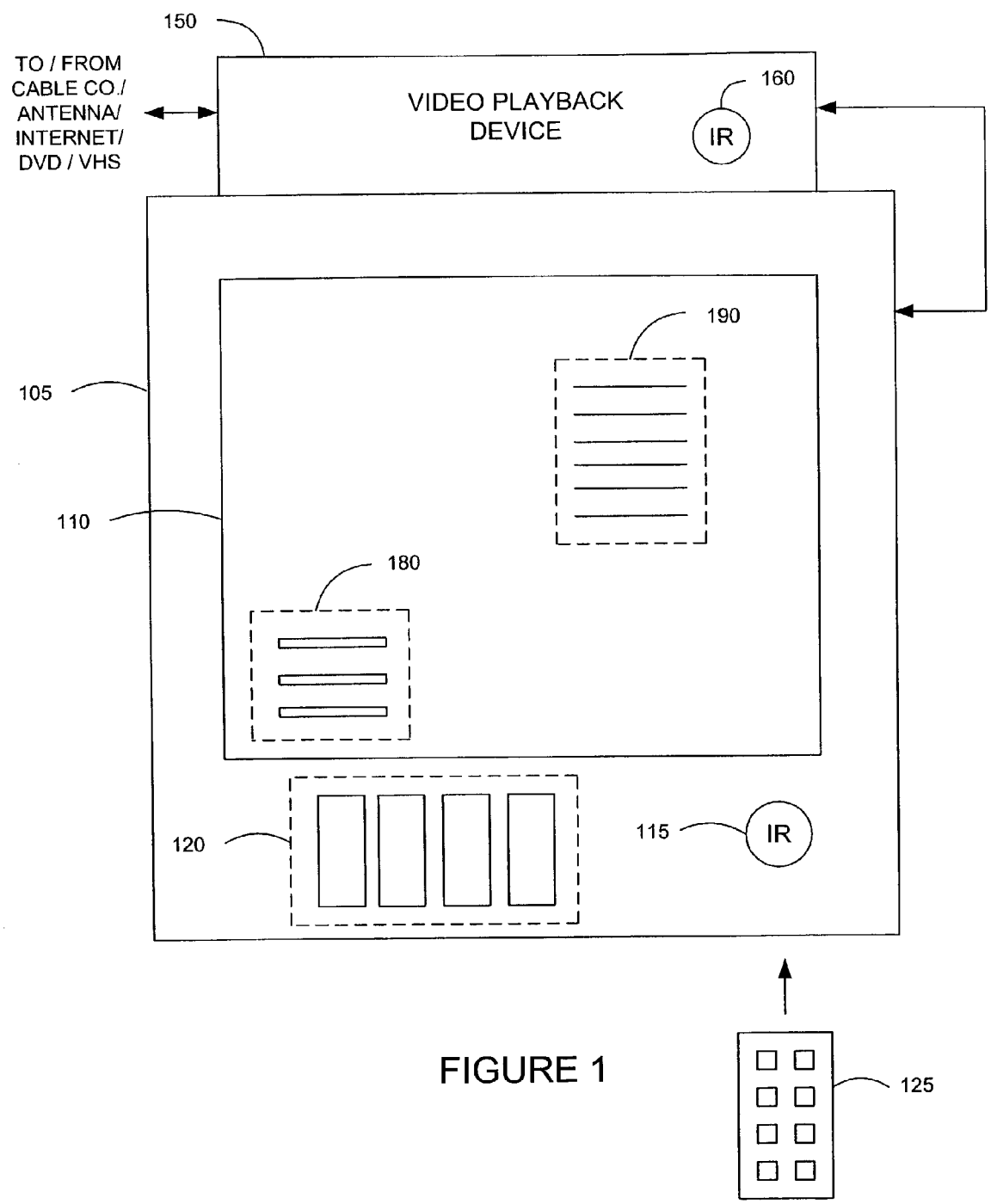
FIG. 1 illustrates an exemplary video display system according to an advantageous embodiment of the present invention.

FIG. 1 illustrates exemplary video playback device 150 and television set 105 according to an advantageous embodiment of the present invention. Video playback device 150 receives incoming television signals from an external source, such as a cable television service provider (Cable Co.), a local antenna, an Internet service provider (ISP), or a DVD or VHS tape player. Video playback device 150 transmits television signals from a viewer selected channel to television set 105. A channel may be selected manually by the user or may be selected automatically by a recording device previously programmed by the user. Alternatively, a channel and a video program may be selected automatically by a recording device based upon information from a program profile in the user's personal viewing history.

In Record mode, video playback device 150 may demodulate an incoming radio frequency (RF) television signal to produce a baseband video signal that is recorded and stored on a storage medium within or connected to video playback device 150. In Play mode, video playback device 150 reads a stored baseband video signal (i.e., a program) selected by the user from the storage medium and transmits it to television set 105. Video playback device 150 may comprise a video recorder of the type that is capable of receiving, recording, interacting with, and playing digital signals.

Video playback device 150 may comprise a video recorder of the type that utilizes recording tape, or that utilizes a hard disk, or that utilizes solid state memory, or that utilizes any other type of recording apparatus. If video playback device 150 is a video cassette recorder (VCR), video playback device 150 stores and retrieves the incoming television signals to and from a magnetic cassette tape. If video playback device 150 is a disk drive-based device, such as a ReplayTVJ recorder or a TiVOJ recorder, video playback device 150 stores and retrieves the incoming television signals to and from a computer magnetic hard disk rather than a magnetic cassette tape, and retrieves stored television signals from the hard disk. In still other embodiments, video playback device 150 may store and retrieve from a local read/write (R/W) digital versatile disk (DVD) or a read/write (R/W) compact disk (CD-RW). The local storage medium may be fixed (e.g., hard disk drive) or may be removable (e.g., DVD, CD-ROM).

Video playback device 150 comprises infrared (IR) sensor 160 that receives commands (such as Channel Up, Channel Down, Volume Up, Volume Down, Record, Play, Fast Forward (FF), Reverse, and the like) from remote control device 125 operated by the user. Television set 105 is a conventional television comprising screen 110, infrared (IR) sensor 115, and one or more manual controls 120 (indicated by a dotted line). IR sensor 115 also receives commands (such as Volume Up, Volume Down, Power On, Power Off) from remote control device 125 operated by the user.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. In some embodiments, video playback device 150 may not even be able to record, but may be limited to playing back television signals that are retrieved from a removable DVD or CD-ROM. Thus, the incoming signal may be a digital signal, an analog signal, or Internet protocol (IP) packets.

However, for purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 2:
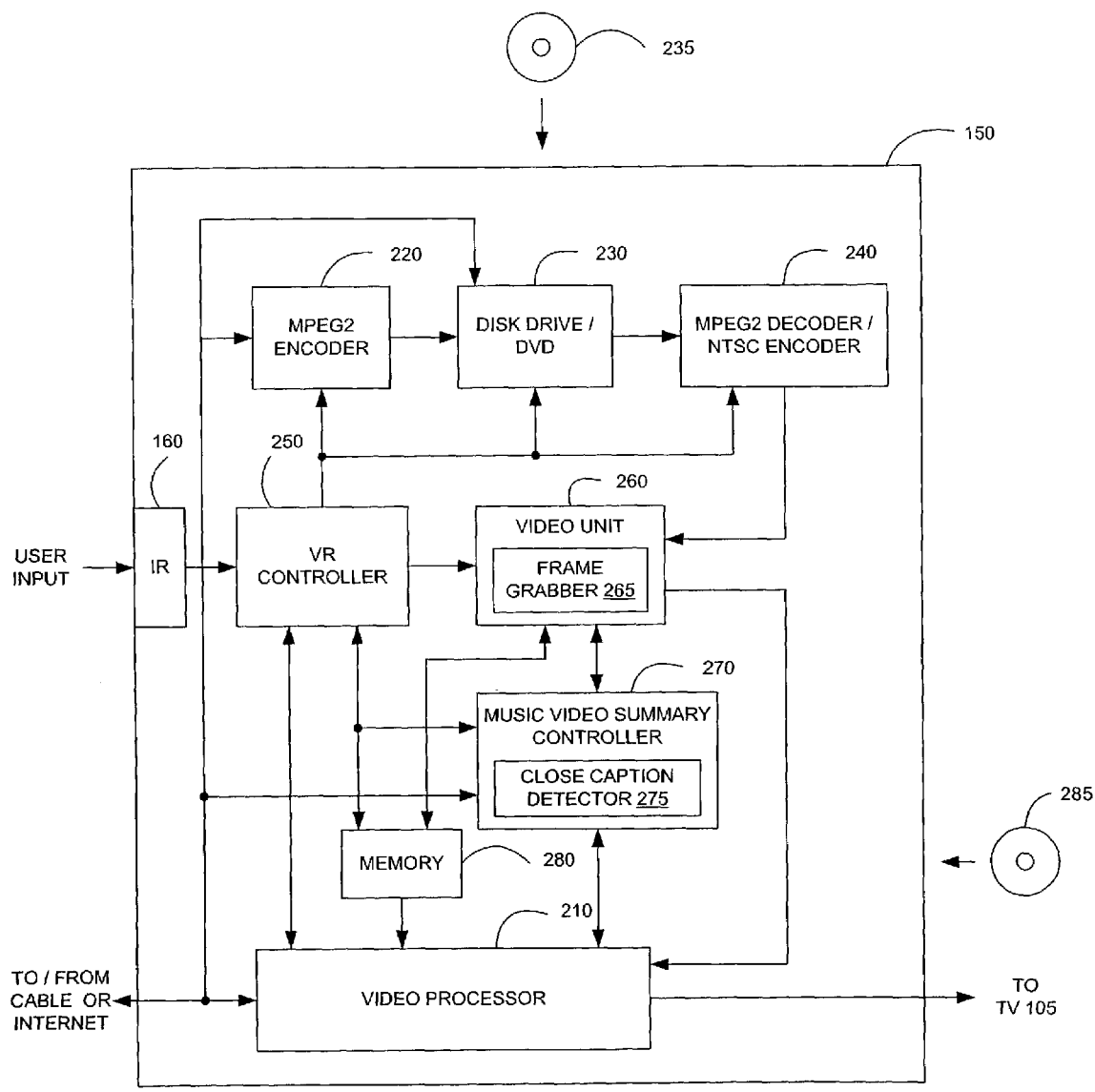
FIG. 2 illustrates a system for indexing and summarizing music videos in the exemplary video display system shown in FIG. 1 according to an advantageous embodiment of the present invention.

FIG. 2 illustrates exemplary video playback device 150 in greater detail according to an advantageous embodiment of the present invention. Video playback device 150 comprises IR sensor 160, video processor 210, MPEG2 encoder 220, hard disk drive 230, MPEG2 decoder/NTSC encoder 240, and video recorder (VR) controller 250. Video playback device 150 further comprises video unit 260 comprising frame grabber 265, music video summary controller 270 comprising close caption detector 275, and memory 280. Frame grabber 265 captures and stores video frames from the output of MPEG2 decoder/NTSC encoder 240. Close caption detector 265 detects close caption text in the NTSC output signal of MPEG2 decoder/NTSC encoder 240.

Although close caption detector 275 is shown located within music video summary controller 270 in FIG. 2, it is not necessary for close caption detector 275 to be located within music video summary controller 270. Close caption detector 275 may be located outside of music video summary controller 270.

VR controller 250 directs the overall operation of video playback device 150, including View mode, Record mode, Play mode, Fast Forward (FF) mode, Reverse mode, and other similar functions. Music video summary controller 270 directs the creation, storage, and playing of music video summaries in accordance with the principles of the present invention.

In View mode, VR controller 250 causes the incoming television signal from the cable service provider to be demodulated and processed by video processor 210 and transmitted to television set 105, with or without storing video signals on (or retrieving video signals from) hard disk drive 230. Video processor 210 contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 (after buffering in video buffer 265 of video unit 260) during Play mode and transmitting a baseband television signal to television set 105.

In Record mode, VR controller 250 causes the incoming television signal to be stored on hard disk drive 230. Under the control of VR controller 250, MPEG2 encoder 220 receives an incoming analog television signal from the cable service provider and converts the received RF signal to the MPEG2 format for storage on hard disk drive 230. Alternatively, if video playback device 150 is coupled to a source that is transmitting MPEG2 data, the incoming MPEG2 data may bypass MPEG2 encoder 220 and be stored directly on hard disk drive 230.

In Play mode, VR controller 250 directs hard disk drive 230 to stream the stored television signal (i.e., a program) to MPEG2 decoder/NTSC encoder 240, which converts the MPEG2 data from hard disk drive 230 to, for example, a super video (S-Video) signal that video processor 210 transmits to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, and MPEG-4 standards, or with one or more other types of standards.

For the purposes of this application and the claims that follow, hard disk drive 230 is defined to include any mass storage device that is both readable and writable, including, but not limited to, conventional magnetic disk drives and optical disk drives for read/write digital versatile disks (DVD-RW), re-writable CD-ROMs, VCR tapes and the like. In fact, hard disk drive 230 need not be fixed in the conventional sense that it is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or attached), such as a juke box device (not shown) that holds several read/write DVDs or re-writable CD-ROMs. As illustrated schematically in FIG. 2, removable disk drives of this type are capable of receiving and reading re-writable CD-ROM disk 235.

Furthermore, in an advantageous embodiment of the present invention, hard disk drive 230 may include external mass storage devices that video playback device 150 may access and control via a network connection (e.g., Internet protocol (IP) connection), including, for example, a disk drive in the user's home personal computer (PC) or a disk drive on a server at the user's Internet service provider (ISP).

VR controller 250 obtains information from video processor 210 concerning video signals that are received by video processor 210. When VR controller 250 determines that video playback device 150 is receiving a video program, VR controller 250 determines if the video program is one that has been selected to be recorded. If the video program is to be recorded, then VR controller 250 causes the video program to be recorded on hard disk drive 230 in the manner previously described. If the video program is not to be recorded, then VR controller 250 causes the video program to be processed by video processor 210 and transmitted to television set 105 in the manner previously described.

In an exemplary embodiment of the present invention, memory 280 may comprise random access memory (RAM) or a combination of random access memory (RAM) and read only memory (ROM). Memory 280 may comprise a non-volatile random access memory (RAM), such as flash memory. In an alternate advantageous embodiment of television set 105, memory 280 may comprise a mass storage data device, such as a hard disk drive (not shown). Memory 280 may also include an attached peripheral drive or removable disk drives (whether embedded or attached) that reads read/write DVDs or re-writable CD-ROMs. As illustrated schematically in FIG. 2, removable disk drives of this type are capable of receiving and reading re-writable CD-ROM disk 285.

Figure 3:
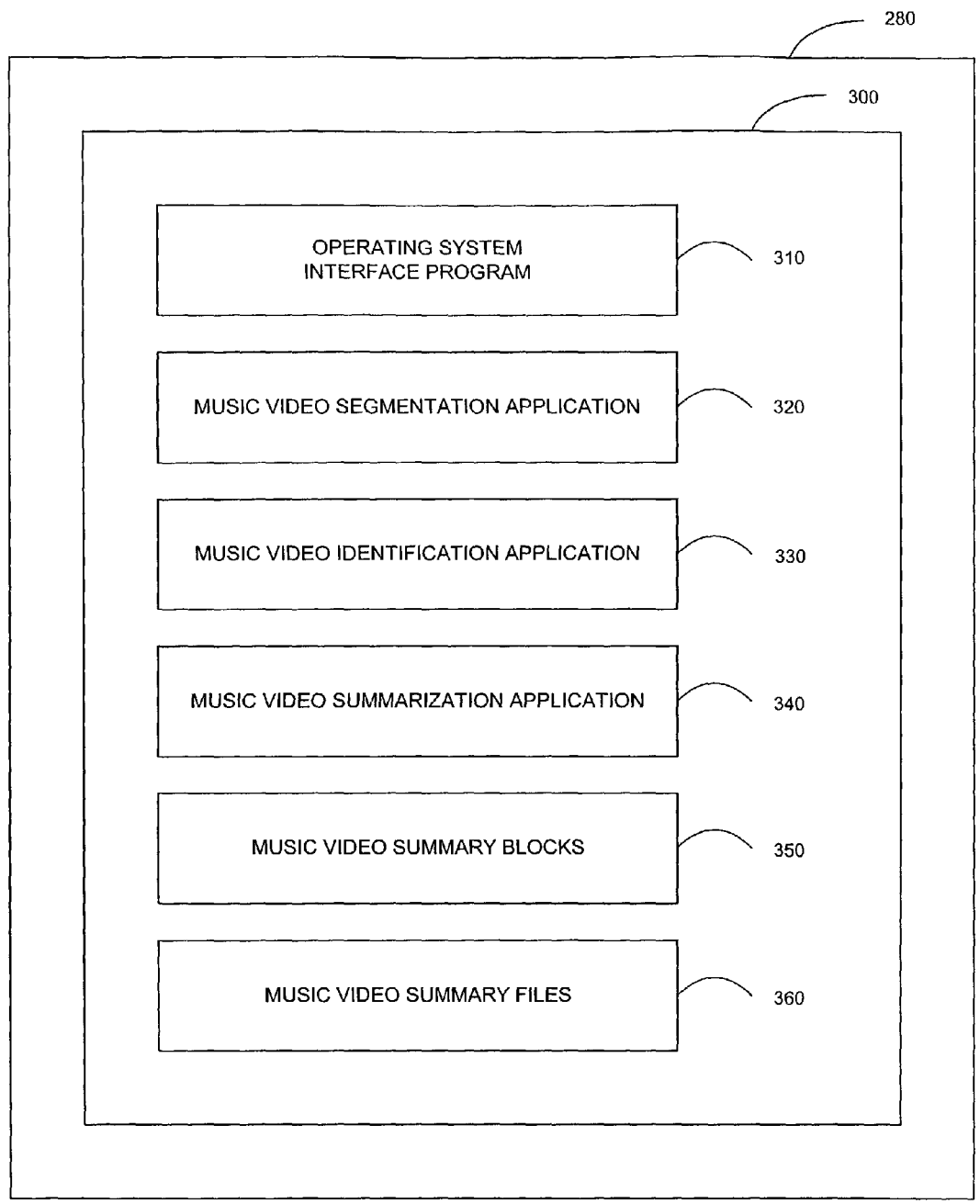
FIG. 3 illustrates music video summary computer software used with an advantageous embodiment of the present invention.

FIG. 3 illustrates a selected portion of memory 280 that contains music video summary computer software 300 of the present invention. Memory 280 contains operating system interface program 310, music video segmentation application 320, music video identification application 330, music video summarization application 340, music video summary blocks 350 and music video summary files 360. Music video summary controller 270 and music video summary computer software 300 together comprise a music video summary control system that is capable of carrying out the present invention. Operating system interface program 310 coordinates the operation of music video summary computer software 300 with the operating system of VR controller 250 and music video summary controller 270.

Figure 4:
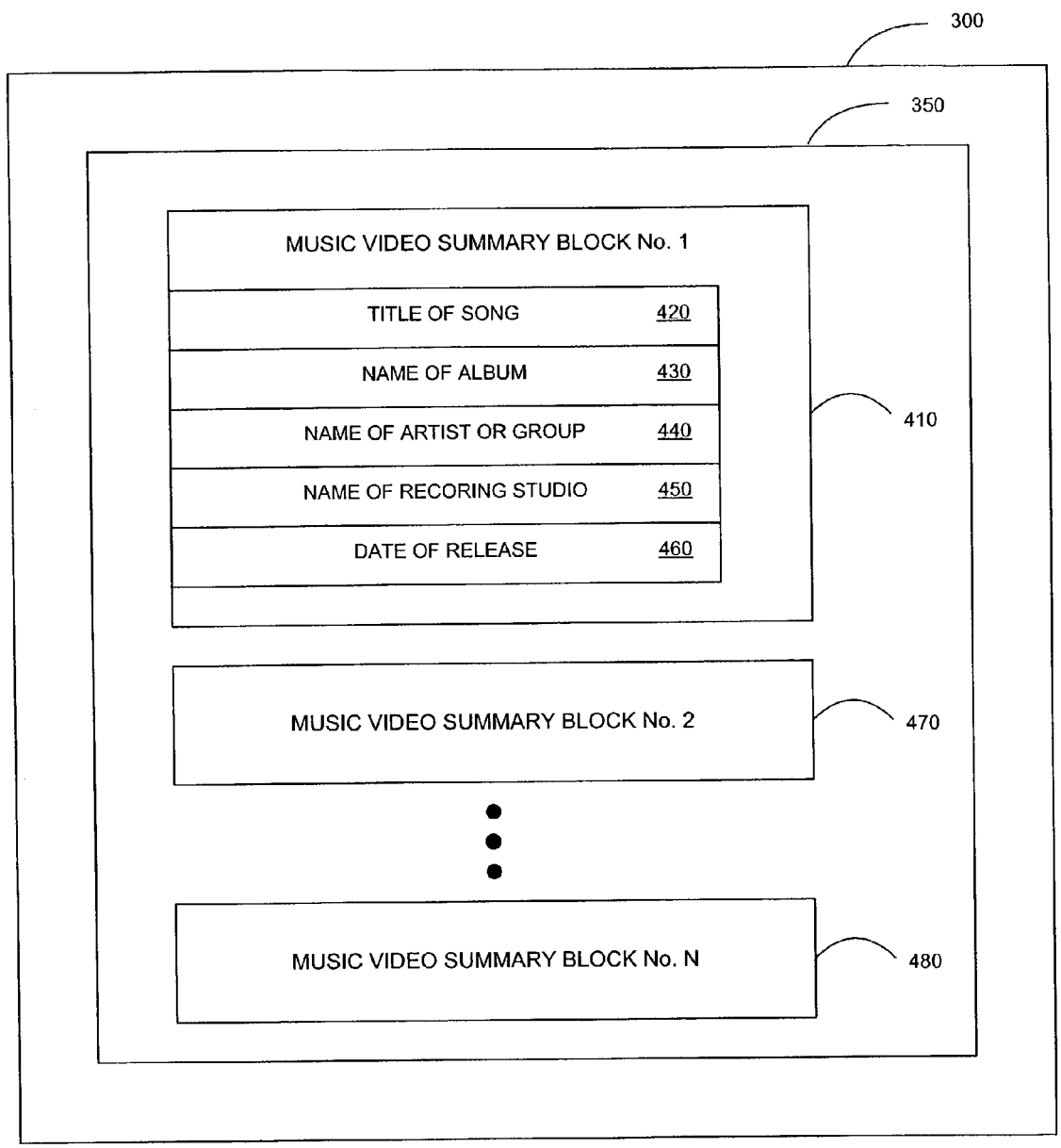
FIG. 4 illustrates music video summary blocks that are used with an advantageous embodiment of the present invention.

FIG. 4 illustrates a group of music video summary blocks 350 as a part of an advantageous embodiment of the present invention. Music video summary controller 270 of the present invention stores information that it obtains about a music video in a music video summary block (e.g., music video summary block 410). The group of music video summary blocks 350 comprises N music video summary blocks (410, 470, ..., 480) where N is an integer. Music video summary block 410 shown in FIG. 4 illustrates the type of information that each music video summary block may contain.

The title of the song is stored in block 420. The name of an album that contains the song is stored in block 430. The name of an artist or group who performed the song is stored in block 440. The name of the recording studio that recorded the song is stored in block 450. Lastly, the date of release of the song is stored in block 460. These categories are illustrative and not exhaustive. That is, other types of information (not shown) may also be stored in a music video summary block of the present invention.

Assume that music video summary controller 270 receives a multimedia data stream that contains music videos. As will be more fully described below, music video summary controller 270 is capable of (1) segmenting music videos in the multimedia data stream and separating them from the remainder of the multimedia data stream, (2) identifying each segmented music video and obtaining information concerning the song that is the subject of each music video, (3) creating a music video summary file for each music video that includes text, audio and video segments, (4) storing the music video summary files, and (4) in response to a user request, displaying the music video summary files in an order selected by the user.

In one advantageous embodiment of the present invention, music video summary controller 270 segments the music videos in the multimedia data stream by finding the beginning and the end of each music video. When a music video is displayed on screen 110 of television 105, the beginning of the music video usually displays a text caption 180 at the bottom of the video image. Text caption 180 usually contains the title of the song, the name of the album, the name of the artist or group, the date of release and other similar information. Text caption 180 is also usually displayed at the end of the music video. Text caption 180 will also be referred to as video text block 180.

Music video summary controller 270 executes computer instructions in music video segmentation application 320 to search for video text block 180 at the beginning and the end of a music video. When two video text blocks 180 are identical, then the portion of video between them represents the music video identified by the two video text blocks 180. The method by which music video summary controller 270 searches for and locates video text blocks 180 will be described more fully below with reference to FIG. 6.

When music video summary controller 270 finds two identical video text blocks 180, then music video summary controller 270 executes computer instructions in music video identification application 330 to extract from a video text block 180 the information that identifies the music video. Music video summary controller 270 may obtain the text of video text block 180 using a method of the type disclosed in U.S. patent application Ser. No. 09/441,943 entitled "Video Stream Classifiable Symbol Isolation Method and System" filed on Nov. 17, 1999 by Lalitha Agnihotri, Nevenka Dimitrova, and Herman Elenbass.

Music video summary controller 270 may access a database (not shown) in memory 280 (or may access a database located on the Internet) to find a comprehensive list of songs, albums, artists, recording companies, etc. to compare with the information that music video summary controller 270 obtains from video text block 180. Music video summary controller 270 stores the information that it obtains concerning a music video in memory 280 in one of the music video summary blocks 350. The music video information for each separate music video is stored in a separate music video summary block (e.g., music video summary block 410).

In some cases music video summary controller 270 may not be able to locate or identify any video text blocks 180. In such cases music video summary controller 270 may compare a transcript of a first few lines of a song with a database of transcripts of song lyrics to find a text match. Music video summary controller 270 selects a "search string" that represents the text of the first few lines of a song. In one embodiment of the present invention, the "search string" text may be obtained from close caption detector 275. Music video summary controller 270 then accesses a database of song lyrics (not shown) in memory 280 (or accesses a database of song lyrics located on the Internet such as www.lyrics.com) to find a comprehensive list of song lyrics. Music video summary controller 270 then compares the "search string" text to the transcripts of in the database of song lyrics to find the identity of the song. After the identity of the song has been determined, the name of the artist and other information can be readily accessed from the database. The method by which music video summary controller 270 searches for and locates music video information by comparing a "search string" text with a database of song lyrics will be described more fully below with reference to FIG. 7.

As previously mentioned, music video summary controller 270 obtains music video information and stores the music information in the music video summary blocks 350. Then for each music video summary block (e.g., music video summary block 410) music video summary controller 270 accesses the song lyrics and identifies a "chorus" of the song from the song lyrics. The chorus of a song is usually identified as a chorus in the database of song lyrics. Alternatively, a portion of the song lyrics that is repeated several times may also be selected to serve as the chorus of the song. This may be accomplished either by using close caption detector 275 or by comparing portions of the audio track to find similar audio patterns.

The "chorus" of the song identifies the nature of the song to most listeners more than the first few lines of the song would. Music video summary controller 270 then matches the chorus in the transcript of song lyrics with the audio and video portions of the multimedia file that correspond to the chorus. Music video summary controller 270 then places a copy of the audio and video portions of the multimedia file that correspond to the chorus in a music video summary file 360.

Music video summary controller 270 stores each music video summary file 360 for each music video in memory 280. In response to receiving a user request, music video summary controller 270 is capable of accessing a particular music video summary file 360 and playing the music video summary file 360 (including audio and video portions) through television 105. Alternatively, music video summary controller 270 is capable of accessing a list 190 of all of the stored music video summary files 360 and displaying the list 190 on screen 110 of television 105. That is, list 190 displays (1) music video summary files of all the music videos that have been detected in the multimedia data stream and (2) the identity of the artist or group that recorded each music video. Using remote control device 125 and IR sensor 160, the user sends a "play music video summary" control signal to music video summary controller 270 to select which music video summary file in list 190 to play next. In this manner the user selects the order in which the music video summary files are played.

Figure 5:
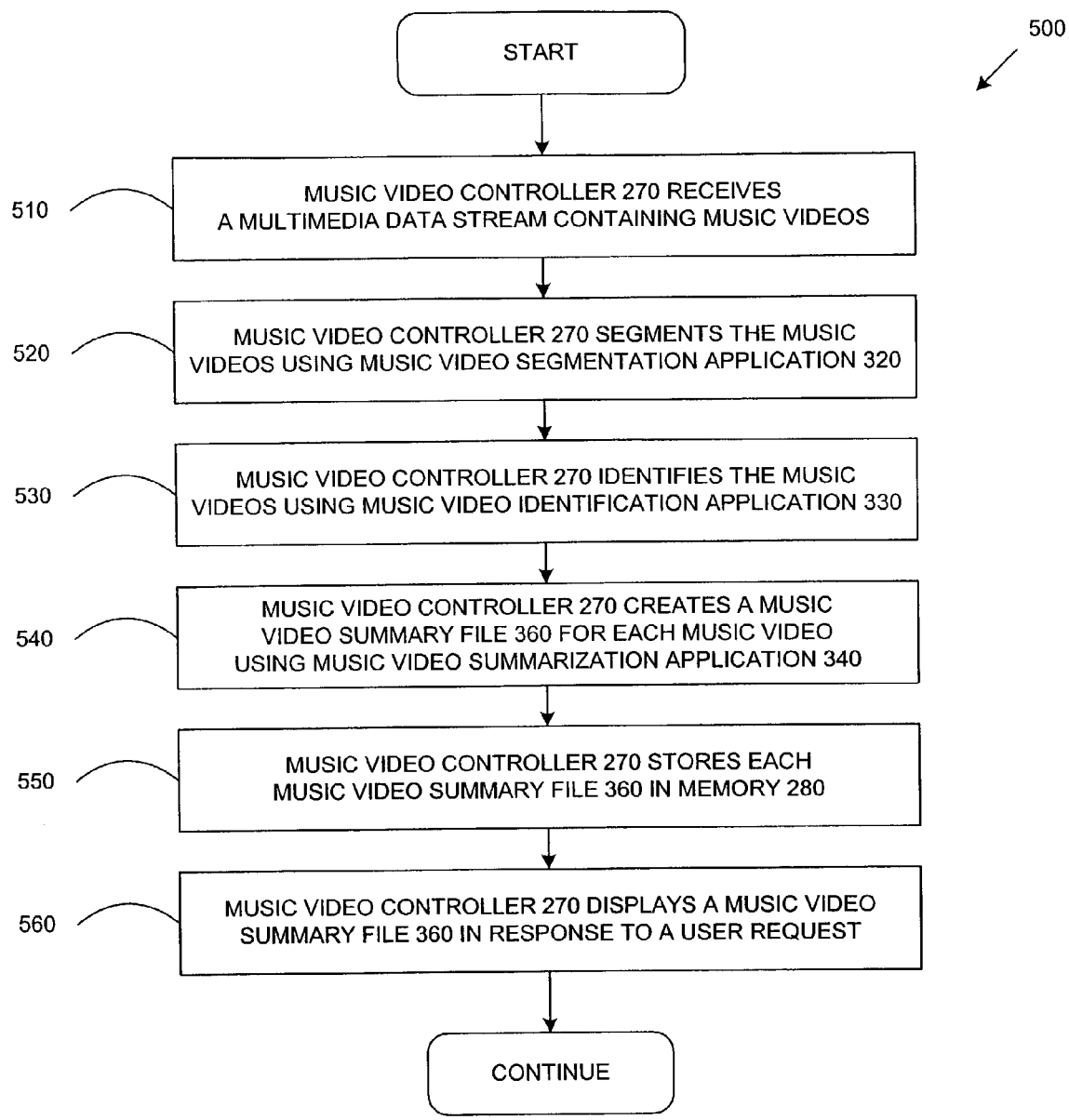
FIG. 5 illustrates a flow diagram of the operation of a method of an advantageous embodiment of the present invention for indexing and summarizing music videos.

FIG. 5 depicts flow diagram 500 illustrating the operation of the method of an advantageous embodiment of the present invention for indexing and summarizing music videos. In the first step of the method music video summary controller 270 receives a multimedia data stream containing music videos (step 510). Music video summary controller 270 segments the music videos using music video segmentation application 320 (step 520). Music video summary controller 270 then identifies the music videos using music video identification application 330 (step 530). Music video summary controller 270 then creates a music video summary file 360 for each music video using music video summarization application 340 (step 540). Music video summary controller 270 then stores each music video summary file 360 in memory 280 (step 550). In response to receiving a user request to display a music summary file, music video summary controller 270 displays the requested music video summary file (step 560).

Figure 6:
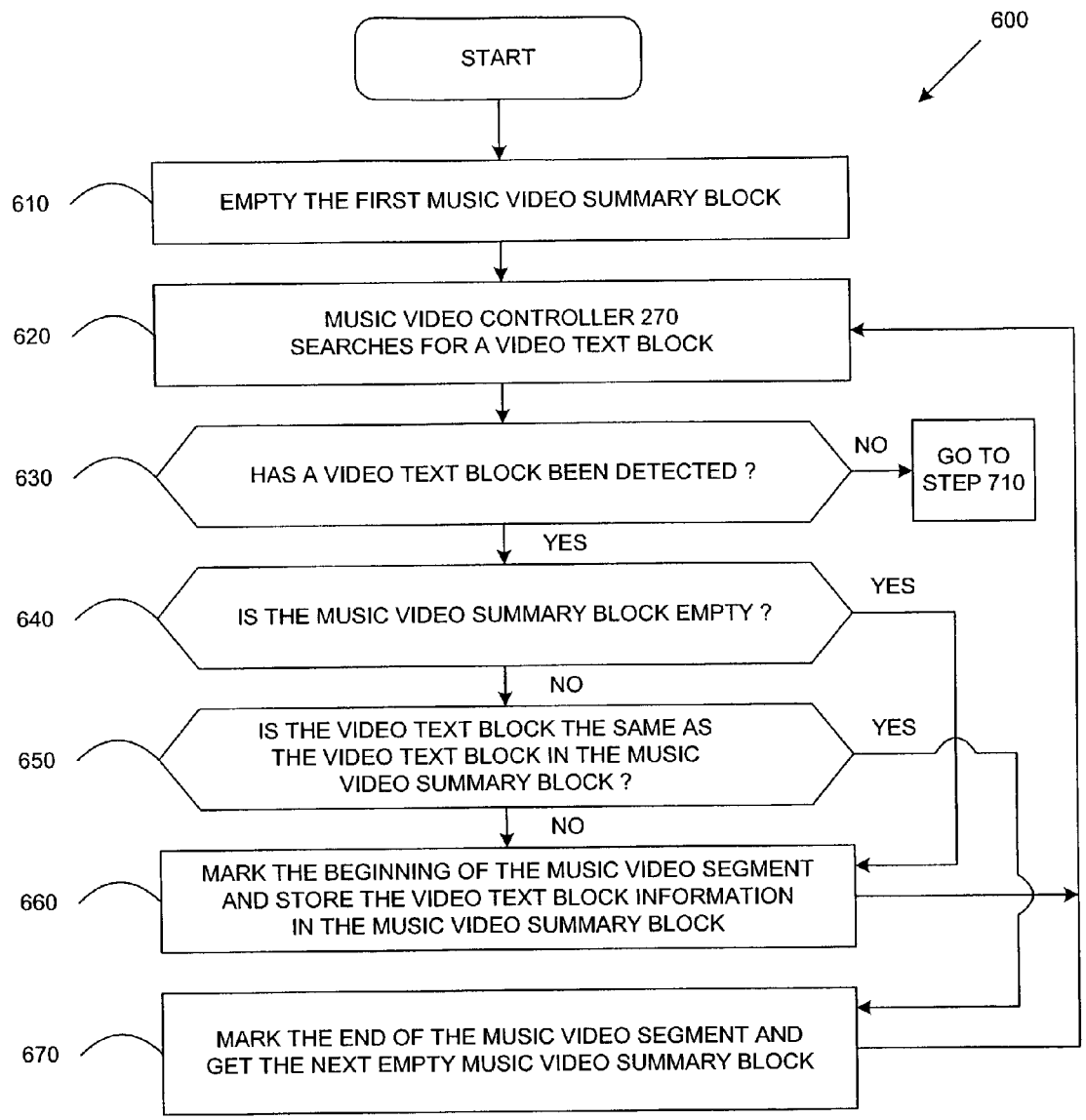
FIG. 6 illustrates a flow diagram of the operation of a first portion of a method of an advantageous embodiment of the present invention for indexing and summarizing music videos.

FIG. 6 depicts flow diagram 600 illustrating the operation of a first portion of a method of an advantageous embodiment of the present invention for indexing and summarizing music videos. In the first step of the first portion of the method music video summary controller 270 empties the first music video summary block (step 610). This may be accomplished by writing a zero ("0") value in each block of the first music video summary block. Music video summary controller 270 then searches for a music video text block 180 in the multimedia data stream (step 620). Music video summary controller 270 determines whether it has detected a video text block 180 (decision step 630). If the search process continues until the end of the multimedia data stream and a video text block is not detected, control then passes to step 710 of FIG. 7.

If a video text block 180 is detected, then the music video summary controller 270 determines whether the music video summary block is empty (decision step 640). If the music video summary block is empty, this means that the video text block 180 is a first video text block 180 (of a possible pair of video text blocks). Therefore, music video summary controller 270 marks the beginning of the music video segment and stores the music video text block information in the music video summary block (step 660). Control then returns to step 620 and music video summary controller 270 searches for the next video text block 180.

When music video summary controller 270 finds the next video text block 180, the determination in decision step 640 is that the music video summary block is not empty. Then music video summary controller 270 determines whether the video text block it has just located is the same as the video text block that is stored in the music video summary block (decision step 650). If the video text block is the same as the previously stored video text block, then music video summary controller 270 knows that it has found the second video text block that represents the end of a music video. Therefore, music video summary controller 270 marks the end of the music video segment and gets the next empty music video summary block (step 670). Control then returns to step 620 and music video summary controller 270 continues to search for other video text blocks (step 620).

If the video text block in decision step 650 is not the same as the previously stored video text block, then the two video text blocks are not part of a pair. That is, each video text block relates to a different music video. Music video summary controller 270 then treats the present video text block as a new text block and stores its information in the music video summary block (step 660). Control then returns to step 620 and music video summary controller 270 continues to search for other video text blocks (step 620). When no more video text blocks are detected in the multimedia data stream, control passes to step 710 of FIG. 7.

Figure 7:
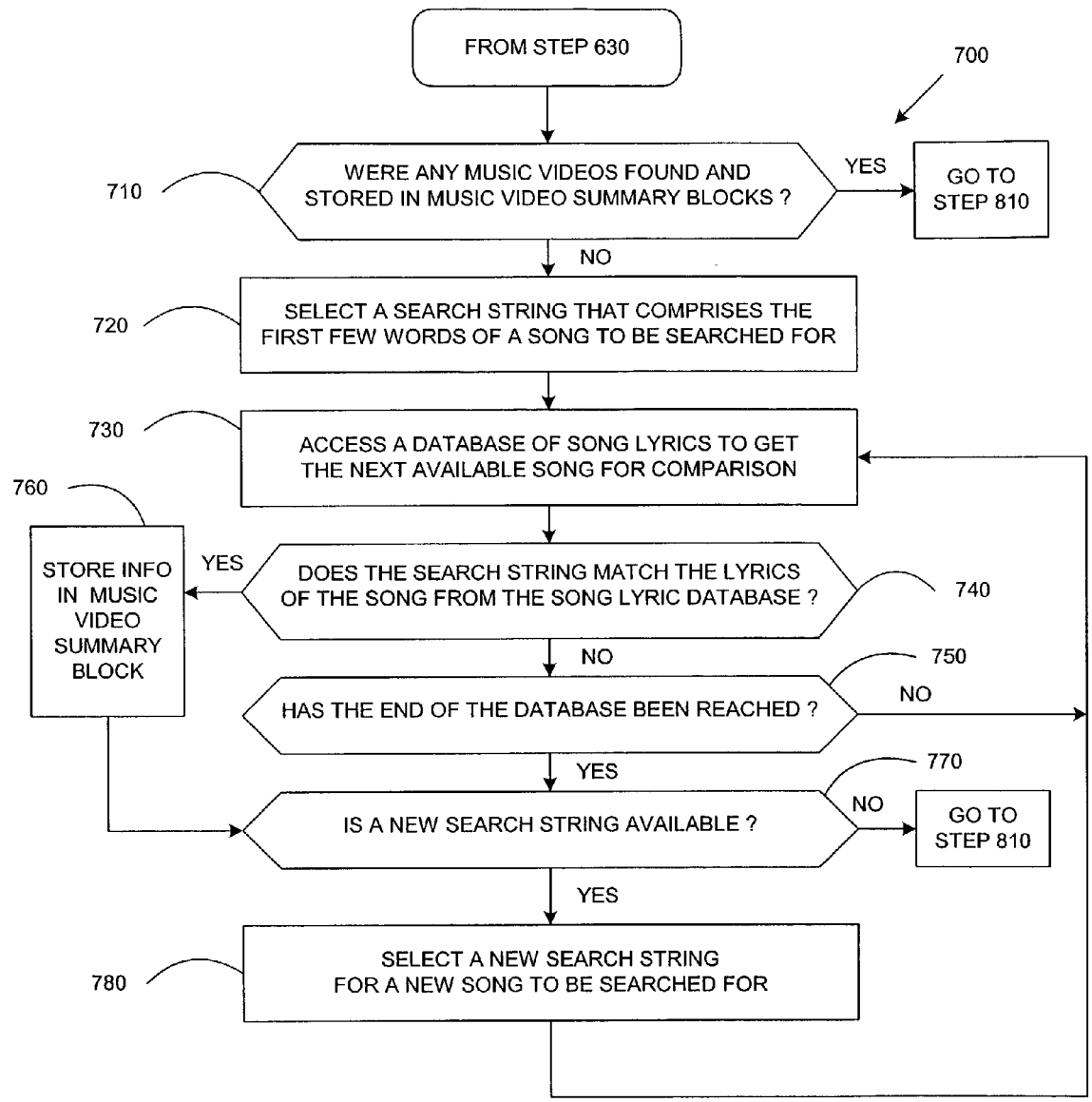
FIG. 7 illustrates a flow diagram of the operation of a second portion of a method of an advantageous embodiment of the present invention for indexing and summarizing music videos.

FIG. 7 depicts flow diagram 700 illustrating the operation of a second portion of a method of an advantageous embodiment of the present invention for indexing and summarizing music videos. In the first step of the second portion of the method music video summary controller 270 determines whether any music videos were found using the method described in FIG. 6 (decision step 710). If music videos were found, the transcription comparison method of FIG. 7 need not be performed and control passes to step 810 of FIG. 8.

In the second step of the second portion of the method music video summary controller 270 selects a search string that comprises the first few words of a song to be searched for (step 720). The search string may be selected by using close caption detector 275 to obtain a text version of the words that are spoken immediately after music begins to play. To accomplish this an audio classifier may be used such as the audio classifier described in the article "Classification of General Audio Data for Content-Based Retrieval" by Dongge Li, Ishwar K. Sethi, Nevenka Dimitrova, and Tom McGee published in Pattern Recognition Letters, Volume 22, Number 5, pages 533–544 (April 2001). The audio classifier described in this article classifies an audio track as speech, music, silence, noise, speech plus music, speech plus speech, and speech plus noise.

The words that are spoken immediately after music begins to play very likely represent the first few words of the lyrics of the song. Music video summary controller 270 then accesses a database of song lyrics to get the song lyrics of the next available song for comparison (step 730). As previously mentioned, the database of song lyrics may be in memory 280 or may be located at a remote location on the Internet.

Music video summary controller 270 then determines whether the words of the search string match the lyrics of the song from the song lyric database (decision step 740). If there is no match, then music video summary controller 270 determines whether the end of the database has been reached (decision step 750). If the end of the database has not been reached, then control returns to step 730 and the next song in the database is accessed for comparison with the search string (step 730). If the end of the database has been reached, then a determination is made whether a new search string is available (decision step 770).

If during the search process, there is a match between the search string and the lyrics of a song from the database, then music video summary controller 270 stores the information that relates to the identified song in the music video summary block (step 760). Control then passes to decision step 770 where a determination is made whether a new search string is available (decision step 770).

If no new search string is available, the transcription comparison method of FIG. 7 is at an end. Control then passes to step 810 of FIG. 8. If a new search string is available, music video summary controller 270 selects a new search string that represents a new song to be searched for (step 780). Control then returns to step 730 and the next song in the database is accessed for comparison with the new search string (step 730).

Figure 8:
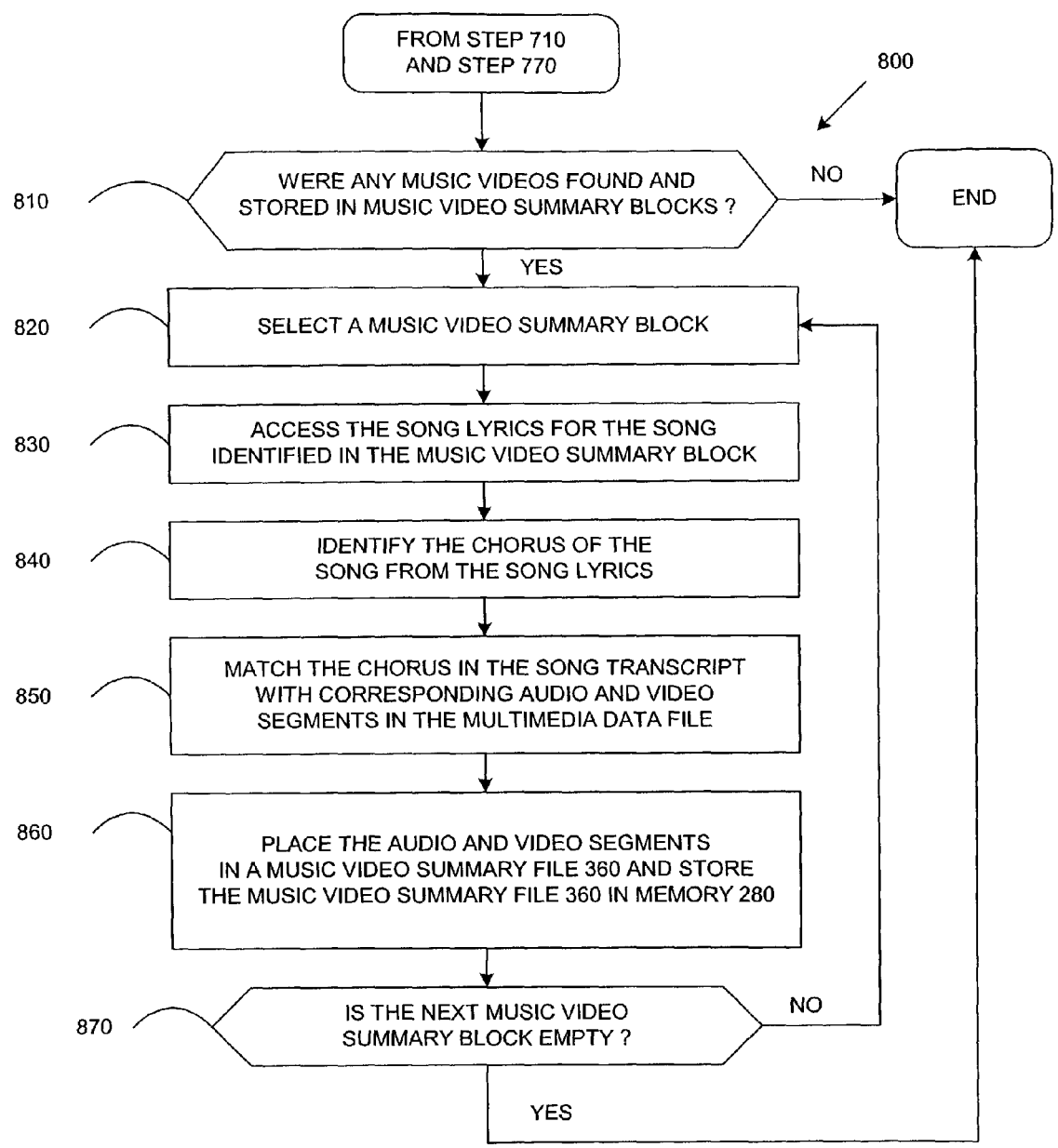
FIG. 8 illustrates a flow diagram of the operation of a third portion of a method of an advantageous embodiment of the present invention for indexing and summarizing music videos.

FIG. 8 depicts flow diagram 800 illustrating the operation of a third portion of a method of an advantageous embodiment of the present invention for indexing and summarizing music videos. In the first step of the third portion of the method music video summary controller 270 determines whether any music videos were found using the methods described in FIG. 6 and in FIG. 7 (decision step 810). If no music videos were found, the music video summarization method of FIG. 8 need not be performed and the method ends.

If music videos were found and stored in music video summary blocks, then music video summary controller 270 begins to summarize the music videos by selecting a music video summary block (step 820). Music video summary controller 270 then accesses the song lyrics for the song identified in the music video summary block (step 830). Music video summary controller 270 then uses the song lyrics to identify a chorus of the song (step 840). As previously described, if song lyrics are not found because they are not available in a database, then the chorus is identified as a few lines that are repeated in the song.

Music video summary controller 270 then matches the chorus of the song in the song transcript with corresponding audio and video segments in the multimedia data file (step 850). Music video summary controller 270 then places the audio and video segments in a music video summary file 360 and stores the music video summary file 360 in memory 280 (step 860).

Music video summary controller 270 then determines whether the next music video summary block is empty (decision step 870). If the next music video summary block is empty, then all of the music videos have been summarized and the method ends. If the next music video summary block is not empty, then control returns to step 820 and music video summary controller 270 continues to summarize music videos as previously described.

The user can send control signals to music video summary controller 270 to cause music video summary controller 270 to record only music videos that fit at least one user selected specification. For example, the user may specify that only music videos performed by a particular artist (or a particular group) be recorded. Alternatively, the user may specify that only music videos be recorded that are released by a particular recording studio. The user specifications may also be combined. For example, the user may specify that only music videos be recorded that are performed by a particular artist for a particular recording studio. In this manner the user is able to provide one or more user specifications to select particular types of music videos to be recorded. All music videos that do not meet the user specifications will not be recorded.

Although the present invention has been described in detail, those skilled in the art should understand that they can make various changes, substitutions and alterations herein without departing from the spirit and scope of the invention in its broadest form.

What is claimed is:

1. An apparatus in a video playback device, said apparatus comprising:
    a music video summary controller capable of receiving a multimedia data stream that comprises a plurality of music videos;
    wherein said music video summary controller is capable of segmenting at least one music video of said plurality of music videos from said multimedia data stream;
    wherein said music video summary controller is capable of identifying said at least one music video of said plurality of music video;
    wherein said music video summary controller is capable of creating a music video summary block for said at least one music video of said plurality of music videos, said music video summary block comprising an item of information relating to said at least one music video, said item of information comprising one of: a title of a song, a name of an album comprising a song, a name of an artist who performed a song, a name of a group who performed a song, a name of a recording studio that released a song, and a date of release of a song;
    wherein said music video summary controller is capable of creating said music video summary file for said at least one music video by identifying a chorus of a song in said at least one music video and by matching said chorus with a corresponding audio segment and a corresponding video segment of said song in said at least one music video; and
    wherein said music video summary controller is capable of placing said corresponding audio segment and said corresponding video segment in said music video summary file.

2. A video playback device, said video playback device comprising:
    a music video summary controller capable of receiving a multimedia data stream that comprises a plurality of music videos;
    wherein said music video summary controller is capable of segmenting at least one music video of said plurality of music videos from said multimedia data stream; and
    wherein said music video summary controller is capable of identifying said at least one music video of said plurality of music videos;
    wherein said music video summary controller is capable of creating a music video summary block for said at least one music video of said plurality of music videos, said music video summary block comprising an item of information relating to said at least one music video, said item of information comprising one of: a title of a song, a name of an album comprising a song, a name of an artist who performed a song, a name of a group who performed a song, a name of a recording studio that released a song, and a date of release of a song; and
    wherein said music video summary controller is capable of creating said music video summary file for said at least one music video by identifying a chorus of a song in said at least one music video and by matching said chorus with a corresponding audio segment and a corresponding video segment of said song in said at least one music video; and
    wherein said music video summary controller is capable of placing said corresponding audio segment and said corresponding video segment in said music video summary file.

3. A method for indexing music videos in a multimedia data stream that is received in a video playback device, said method comprising the steps of:
    receiving in a music video summary controller a plurality of music videos in a multimedia data stream;
    segmenting at least one music video of said plurality of music videos from said multimedia data stream;
    identifying said at least one music video of said plurality of music videos;
    creating a music video summary block for said at least one music video of said plurality of music videos, said music video summary block comprising an item of information relating to said at least one music video, said item of information comprising one of: a title of a song, a name of an album comprising a song, a name of an artist who performed a song, a name of a group who performed a song, a name of a recording studio that released a song, and a date of release of a song; and creating said music video summary file for said at least one music video by identifying a chorus of a song in said at least one music video;

matching said chorus with a corresponding audio segment and a corresponding video segment of said song in said at least one music video; and placing said corresponding audio segment and said corresponding video segment in said music video summary file.

4. Computer-executable instructions stored on a computer-readable storage medium for indexing music videos in a multimedia data stream that is received in a video playback device, said computer-executable instructions comprising the steps of:

receiving in a music video summary controller a plurality of music videos in a multimedia data stream;

segmenting at least one music video of said plurality of music videos from said multimedia data stream;

identifying said at least one music video of said plurality of music videos;

creating a music video summary block for said at least one music video of said plurality of music videos, said music video summary block comprising an item of information relating to said at least one music video, said item of information comprising one of: a title of a song, a name of an album comprising a song, a name of an artist who performed a song, a name of a group who performed a song, a name of a recording studio that released a song, and a date of release of a song;

creating said music video summary file for said at least one music video by identifying a chorus of a song in said at least one music video;

matching said chorus with a corresponding audio segment and a corresponding video segment of said song in said at least one music video; and placing said corresponding audio segment and said corresponding video segment in said music video summary file.

5. An apparatus in a video playback device, said apparatus comprising:

a music video summary controller capable of receiving a multimedia data stream that comprises a plurality of music videos;

wherein said music video summary controller is capable of segmenting at least one music video of said plurality of music videos from said multimedia data stream; and wherein said music video summary controller is capable of identifying said at least one music video of said plurality of music videos; and wherein said music video summary controller is capable of identifying said at least one music video by creating a search string that comprises at least one word of a song to be searched for within the closed captioning of the music video and by matching said search string with a transcript of song lyrics of said song to be searched.

6. A video playback device, said video playback device comprising:

a music video summary controller capable of receiving a multimedia data stream that comprises a plurality of music videos;

wherein said music video summary controller is capable of segmenting at least one music video of said plurality of music videos from said multimedia data stream; and wherein said music video summary controller is capable of identifying said at least one music video of said plurality of music videos; and wherein said music video summary controller is capable of identifying said at least one music video by creating a search string that comprises at least one word of a song to be searched for within the closed captioning of the at least one music video and by matching said search string with a transcript of song lyrics of said song to be searched.

7. A method for indexing music videos in a multimedia data stream that is received in a video playback device, said method comprising the steps of:

receiving in a music video summary controller a plurality of music videos in a multimedia data stream;

segmenting at least one music video of said plurality of music videos from said multimedia data stream;

identifying said at least one music video of said plurality of music videos;

identifying said at least one music video by creating a search string that comprises at least one word of a song to be searched for within the closed captioning of the at least one music video and by matching said search string with a transcript of song lyrics of said song to be searched.

8. Computer-executable instructions stored on a computer-readable storage medium for indexing music videos in a multimedia data stream that is received in a video playback device, said computer-executable instructions comprising the steps of:

receiving in a music video summary controller a plurality of music videos in a multimedia data stream;

segmenting at least one music video of said plurality of music videos from said multimedia data stream;

identifying said at least one music video of said plurality of music videos;

identifying said at least one music video by creating a search string that comprises at least one word of a song to be searched for and by matching said search string with a transcript of song lyrics of said song to be searched.

* * * * *